US006662834B1

(12) United States Patent
Harrington et al.

(10) Patent No.: US 6,662,834 B1
(45) Date of Patent: Dec. 16, 2003

(54) TREE DELIMBER

(76) Inventors: William N. Harrington, 2441 Hwy. 528, Heidelberg, MS (US) 39439; William B. Hendry, 55 CR 52814, Paulding, MS (US) 39348

( * ) Notice: Subject to any disclaimer, the term of this patent is extended or adjusted under 35 U.S.C. 154(b) by 0 days.

(21) Appl. No.: 10/329,691

(22) Filed: Dec. 27, 2002

(51) Int. Cl.⁷ .............................................. A01G 23/095
(52) U.S. Cl. .................................... 144/24.13; 144/343
(58) Field of Search .............................. 144/4.1, 24.13, 144/335, 336, 338, 343

(56) References Cited

U.S. PATENT DOCUMENTS

| | | | |
|---|---|---|---|
| 3,805,858 A | * 4/1974 | Morin | 144/24.13 |
| 3,868,981 A | * 3/1975 | Nadeau | 144/24.13 |
| 4,067,367 A | 1/1978 | Adamson | |
| 4,147,190 A | * 4/1979 | Nadeau | 144/24.13 |
| 4,440,202 A | * 4/1984 | Everett | 144/24.13 |
| 6,155,317 A | 12/2000 | Seymour | |
| 2002/0062877 A1 | 5/2002 | Seymour | |
| 2002/0062880 A1 | 5/2002 | Seymour | |

* cited by examiner

*Primary Examiner*—W. Donald Bray
(74) *Attorney, Agent, or Firm*—Richard C. Litman

(57) ABSTRACT

A felled tree delimbing system which is skid mounted, having; a steel, horizontal chute with vertical cutting bars at one end where an overhead locking and cutting arm cooperates with the cutting bars. The operator engages the device by placing a bundle of cut trees horizontally on the chute, the tree's weight forcing down a trigger, causing the counterweighted cutting arm to close over the trees forcing them into rectangular openings formed thereby. The bundle of trees is in the grasp of a logger's knuckle boom crane or similar piece of equipment at the lower portion of the tree trunks. The trees are then pulled along the chute through the edged rectangles, thus shearing off and removing limbs and branches from the upper part of the tree trunks. Upon removal of delimbed trunks from the chute, the unweighted trigger is released, allowing the cutting arm to return to an open position through action of pulleys and a counter weight.

20 Claims, 12 Drawing Sheets

TREE DELIMBER

BACKGROUND OF THE INVENTION

1. Field of the Invention

The present invention relates to lumber industry apparatus. More particularly, the present invention relates to a push and pull-through delimber device for use in stripping tree trunks of limbs during tree harvesting.

2. Description of the Related Art

Tree delimbers have been useful devices for the logging industry due to the extensive labor involved in hand chopping limbs from the felled tree trunk. Earlier devices are designed for a single tree, often a large tree such as might exist in a virgin forest. With the advent of tree farms for evergreens such as pine, it is common to harvest a large number of trees of similar size. These trees are not allowed to grow to great size, but only the size desired. In the case of trees grown to be fed to chippers to produce laminated structural members, the most efficient size for length of growing time is selected for harvesting the trees. It has become desirable to provide delimbers which can delimb a number of relatively small diameter tree trunks simultaneously. These trunks are relatively, consistent in size, since they have had the same growing period and conditions, which makes it possible to create an efficient multi-tree delimber and use it successfully. Such delimbers typically employ a knuckle boom crane which grasps a number of felled trees by their lower trunk and pushes or pulls them through a frame having multiple openings. Previous delimbers of this type are large and heavy, making them expensive and difficult to move between foresting locations. It would be desirable to provide an effective delimber for this type of service which is relatively light, may be easily moved such as by means of built in skids, and is effective in accomplishing the delimbing job with minimum labor and equipment.

U.S. Pat. No. 6,155,317, issued Dec. 5, 2000 to Seymour, describes a mechanical pull-through tree limb remover having opposed, semicircular blades. These blades are closed by counterweights and opened by the operation of a lever that is coupled with the cutting blades. The pull-through force is provided by a grapple loader or other lifting device.

U.S. Pat. No. 4,067,367, issued Jan. 10, 1978 to Adamson, describes a tree limb remover constructed of an upright welded metal pipe frame. This frame has square openings that allow trees to be pushed through, snapping off any attached limbs and branches.

U.S. Patent Publication Nos. 2002/00628880 and 2002/0062877 A1, each published May 30, 2002, describe trailer mounted push-through tree limb removers. The respective tree limb removers have frames with cutting blades, chutes and saws that allow trees to be topped and de-limbed in one operation. The pull-through forces to operate these devices are supplied by knuckle boom loaders and process a number of trees simultaneously as grasped by the knuckle boom.

None of the above inventions and patents, taken either singly or in combination, is seen to describe the instant invention as claimed. Thus, a tree delimber solving the aforementioned problems is desired.

SUMMARY OF THE INVENTION

The tree delimber is a felled tree delimbing system which is skid mounted, having a steel, horizontal chute with vertical cutting bars at one end where an overhead locking and cutting arm or blade cooperates with the cutting bars. The operator engages the device by placing a bundle of cut trees horizontally on the chute, the tree's weight forcing down a trigger, causing the counter-weighted cutting arm to close over the trees forcing them into rectangular openings formed thereby. The bundle of trees is in the grasp of a logger's knuckle boom crane or similar piece of equipment at the lower portion of the tree trunks. The trees are then pulled along the chute through the edged rectangles, thus shearing off and removing limbs and branches from the upper part of the tree trunks. Remaining limbs and branches are removed by pulling the trees back through the rectangles. Upon the operators causing the knuckle boom to lift the delimbed tree trunks from the chute, the unweighted trigger is released, allowing the cutting arm to return to an open position through action of pulleys and a counter weight. The tree trunks can then be topped as desired with a logger's saw.

Accordingly, it is a principal object of the invention to provide a tree delimber which is light in weight and easily portable.

It is another object of the invention to provide a tree delimber which is designed to delimb a number of relatively small trees at one time.

It is a further object of the invention to provide a tree delimber which is mounted on skids for easy transport.

Still another object of the invention is to provide a tree delimber having a tree weight trigger and a counterweighted, vertically swinging upper blade swinging in a vertical arc between a vertical open position to allow easy access to the delimber and a horizontal closed position for effective delimbing.

It is an object of the invention to provide improved elements and arrangements thereof for, the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a felled tree delimbing system which is skid mounted, having a steel, horizontal chute with vertical cutting bars at one end where an overhead locking and cutting arm or blade cooperates with the cutting bars. The operator engages the device by placing a bundle of cut trees horizontally on the chute, the tree's weight forcing down a trigger, causing the counter-weighted top blade to rotate downward and close over the trees, forcing them into rectangular openings formed thereby.

Figure 1A:
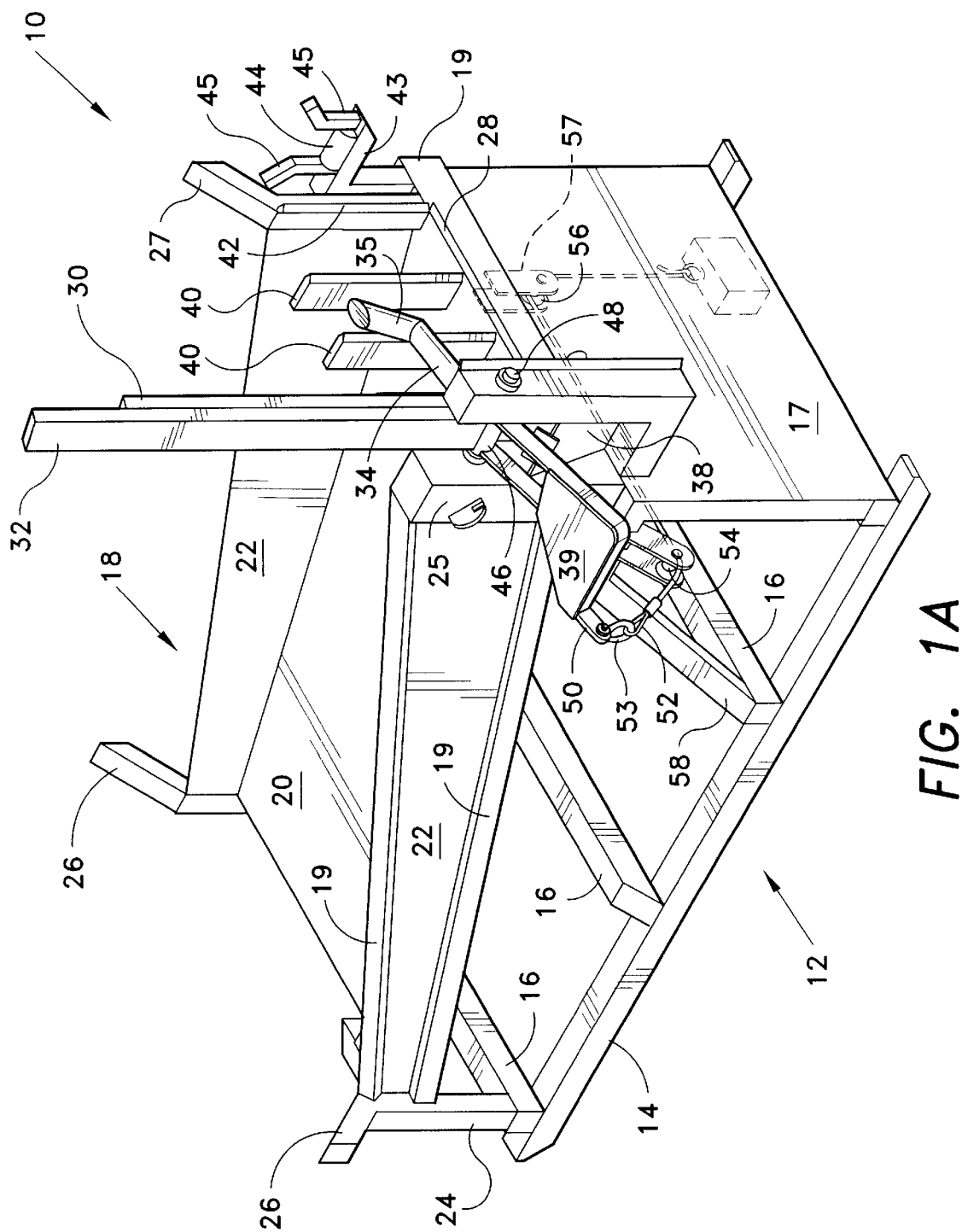
FIG. 1A is a rear perspective view of a tree delimber according to the present invention with the upper blade in the open position.

Referring to the Figures, there is shown in FIG. 1A a rear perspective view of the tree delimber of the present invention, the delimber device being referred to generally as delimber 10. Delimber 10 is generally of welded steel construction in its preferred embodiment and includes base 12 having parallel skids 14 and front, center and rear cross members 16. Mounted above base is back support plate 17 extending from base 12 to the rear portion of chute 18.

Chute 18 has first and second opposing sidewalls 22 and a bottom wall sloping upward from front supports 24 to rear supports 25 and framed for reinforcement by upper and lower frame members 19 attached between the front supports 24 and rear supports 25 as by conventional means such as welding. Front supports 24 rest on the front member of cross member 16 above respective skids 14. Front wing bars 26 extend respectively outward at an inclined angle from the tops of respective front supports 24 to capture and direct tree trunks into the chute 18. Chute rear wing bar 27 similarly extends outward at an inclined angle from the rear support 25 by which top knife horizontal stop support 43 is attached.

A horizontal series of tree trunk receiver and delimber knives are formed by bottom knife edge 28 formed by horizontal rear chute frame portion 19, an elongated top knife member having top knife edge 30 supported by elongated top knife body 32, vertical knives 40 spaced along and extending upward from the rear end of the chute bottom wall 20, and outside vertical knives 42 extending along rear supports 25. Vertical knives 40 and 42 have rearwardly facing edges. This is accomplished by placing tree trunks T for delimbing on knife trigger 34, having a mounted end and an angled free end 35 which causes top knife body 32 to descend to a point below the lower limbs L of the trunks T. Knife trigger 34, top knife body 32 and counter weight arm 36, each having a mounted end and a free end are serially mounted on pivot sleeve 46 supported between the first of first and second rear support frame members 25 and vertical knife support 29 attached to and extending upward from the rear support plate 17.

Top knife body 32 has a mounted end and a free end and is selectively rotatable between an open vertical position and a horizontal closed position. Upon descent of knife trigger 34, top knife body 32 rotates downward from the vertical open position to a horizontal closed position to cover tree trunks T, and counterweight arm 36 is rotated upward from rest on counterweight arm stop 37. The vertical knives 40 and 42, the upper edge on horizontal rear frame member 19 and the horizontal top knife edge 30 form a horizontal series of openings for each receiving one or more cut tree trunks for delimbing.

Counterweight arm stop 37 is supported by stop support 38 extending upward along top knife support 29 while spacing top knife support 29 horizontally to the rear of the lower back chute frame 19, the top knife support 29 having a corresponding horizontal portion abutting rear support plate 17 and extending rearwardly therefrom to a vertical portion thereof. Pivot bar 48 extends horizontally between chute first rear support 25 and top knife support 29 and rotatably and concentrically supports pivot sleeve 46, allowing rotation of attached top knife body 32, knife trigger 34 and counterweight arm 36. This arrangement allows the trigger member 34, and the top knife body 32 to freely rotate through an arc immediately behind vertical knives 40 and 42, horizontal rear frame member 19 and rear support plate 17, without interference therewith.

Butt plate 39 is mounted on the free upper end portion of counter weight arm 36 and allows the manual raising of top knife body 32 after moving delimber 10 to a new location. During movement of delimber 10 on skids 14 or by other apparatus, knife body 32 is lowered to its horizontal position as a matter of safety and clearance. When the knife body 32 is in the horizontal position, the free end portion rests on horizontal stop 44 supported by top knife horizontal top support 43 and, thereby, top knife edge 30, thus defining the height of the delimber trunk openings. Stop guides 45 extend upward and outward from support 43 to guide the free end portion of top knife body 32 into the stop 44.

A counterweight line 52 is supported by first pulley 54 mounted for rotation on counterweight line bracket 50 mounted on the free end of counter weight arm 36 and extending outward therefrom. Arm 36 extends forward at its free end such that line bracket 50, counterweight line 52, and first pulley 54 operates forward of back plate 17. Butt plate 39 assumes the generally triangular form of the free end portion of counterweight arm 36 and has a forward corner, the counterweight line bracket 50 being mounted at the butt plate forward corner.

Back plate angle supports 15 extend rearward at an inclined angle from the respective ends of the rearmost cross member 16 and then form a horizontal, rear-directed portion which attaches to the upper respective corner of the back plate 17. First pulley bracket 55 extends outward at a downward incline from the rear-directed portion of back plate angle support 15 so as to support first pulley 54 below the free end of counterweight arm 36. Counterweight line 52 is attached to the free end of bracket 50 by means of attachment ring 53.

A second pulley 56 is supported by a second pulley bracket 57 mounted on the inner side of the upper portion of back plate 17 and spaced from first pulley 54 by about half of the width of the back plate 17, the exact location not being critical. The second pulley bracket 57 may be mounted at the horizontal rear chute frame portion 19 in a manner such that second pulley 56 is free to support line 52 in a generally horizontal manner from first pulleys 54 and to allow line 52 to support counterweight W for vertical movement as counterweight arm 36 and thereby top knife body 32 travels between open and closed positions.

Figure 9:
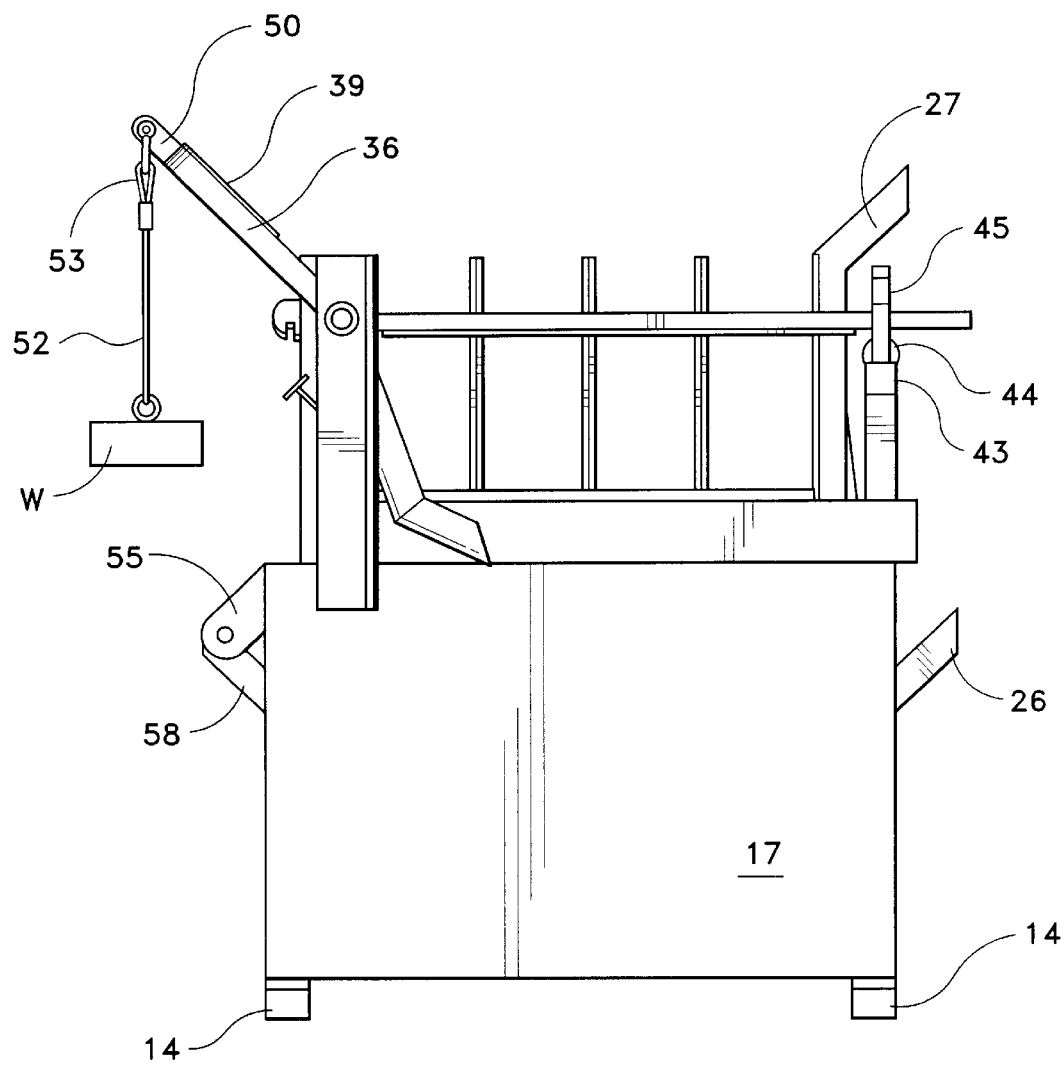
FIG. 9 is a rear elevation view of another embodiment of the invention similar to that of FIG. 8.

In an alternative embodiment, counterweight W is suspended by line 52 directly from the first pulley 54 as supported by the free end of first pulley bracket 55 as shown in FIG. 9.

Figure 1B:
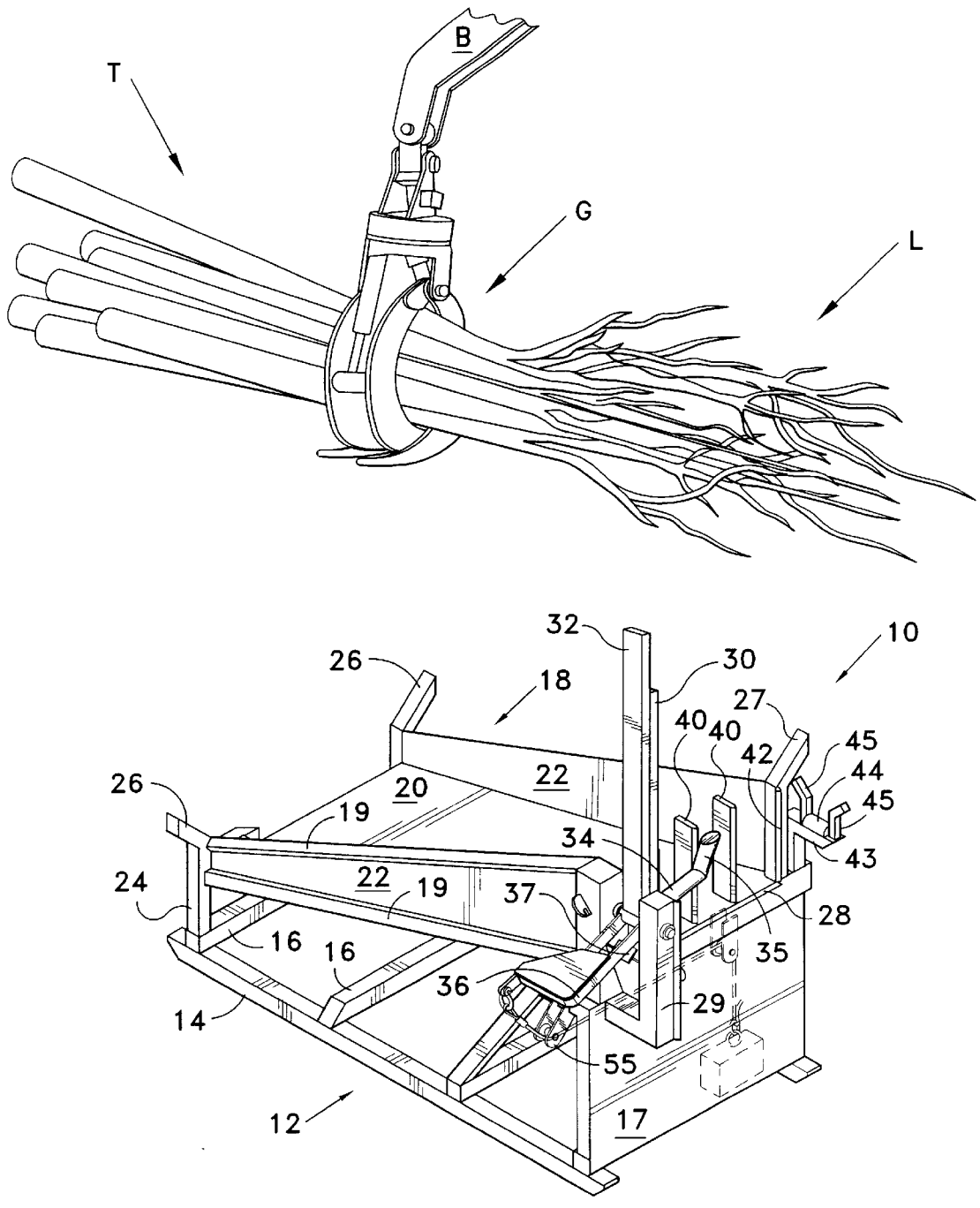
FIG. 1B is an environmental rear perspective view of the tree delimber according to FIG. 1A
Figure 2A:
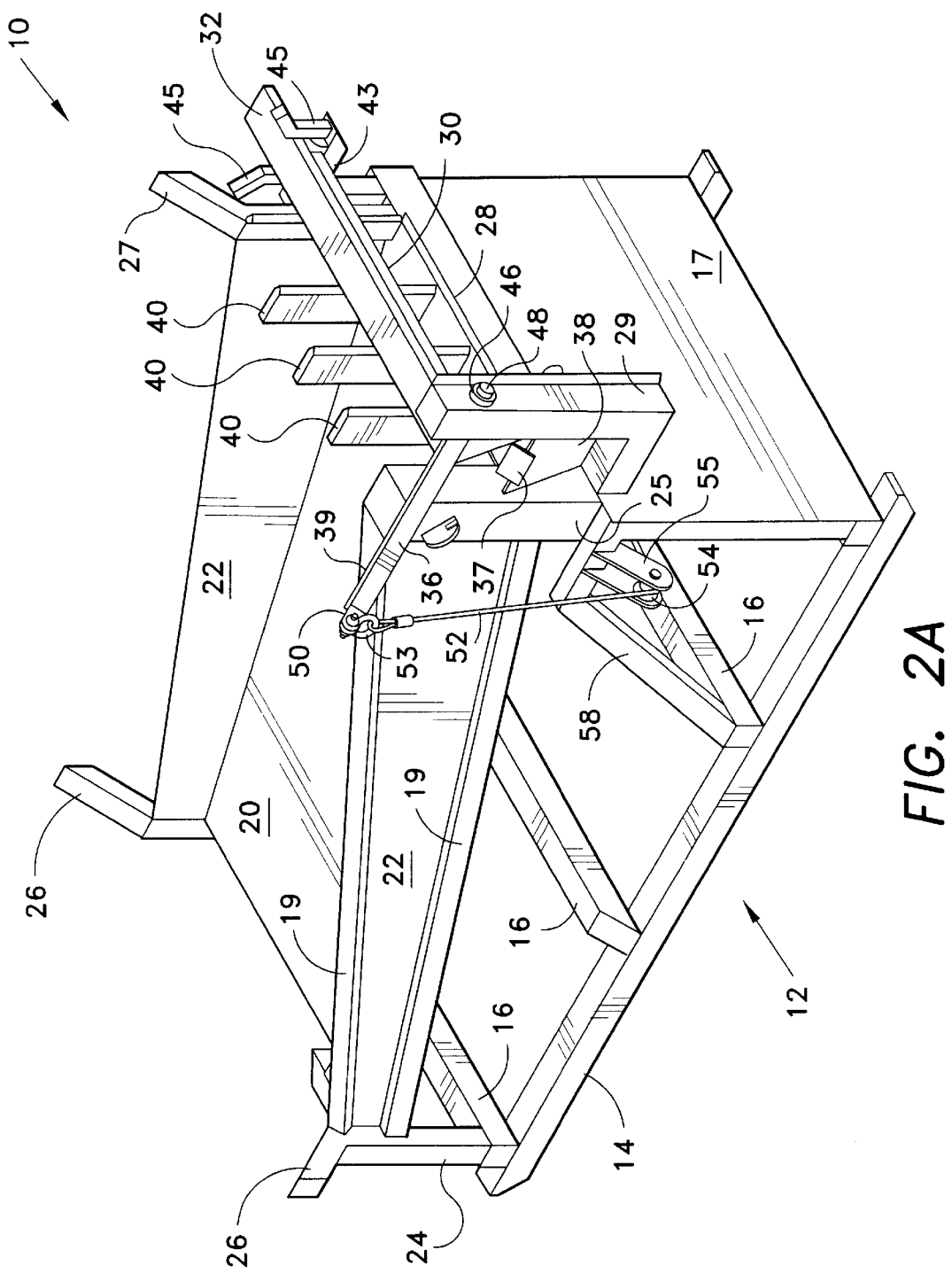
FIG. 2A is a rear perspective view of a tree delimber according to FIG. 1 with the upper blade in a closed position.
Figure 2B:
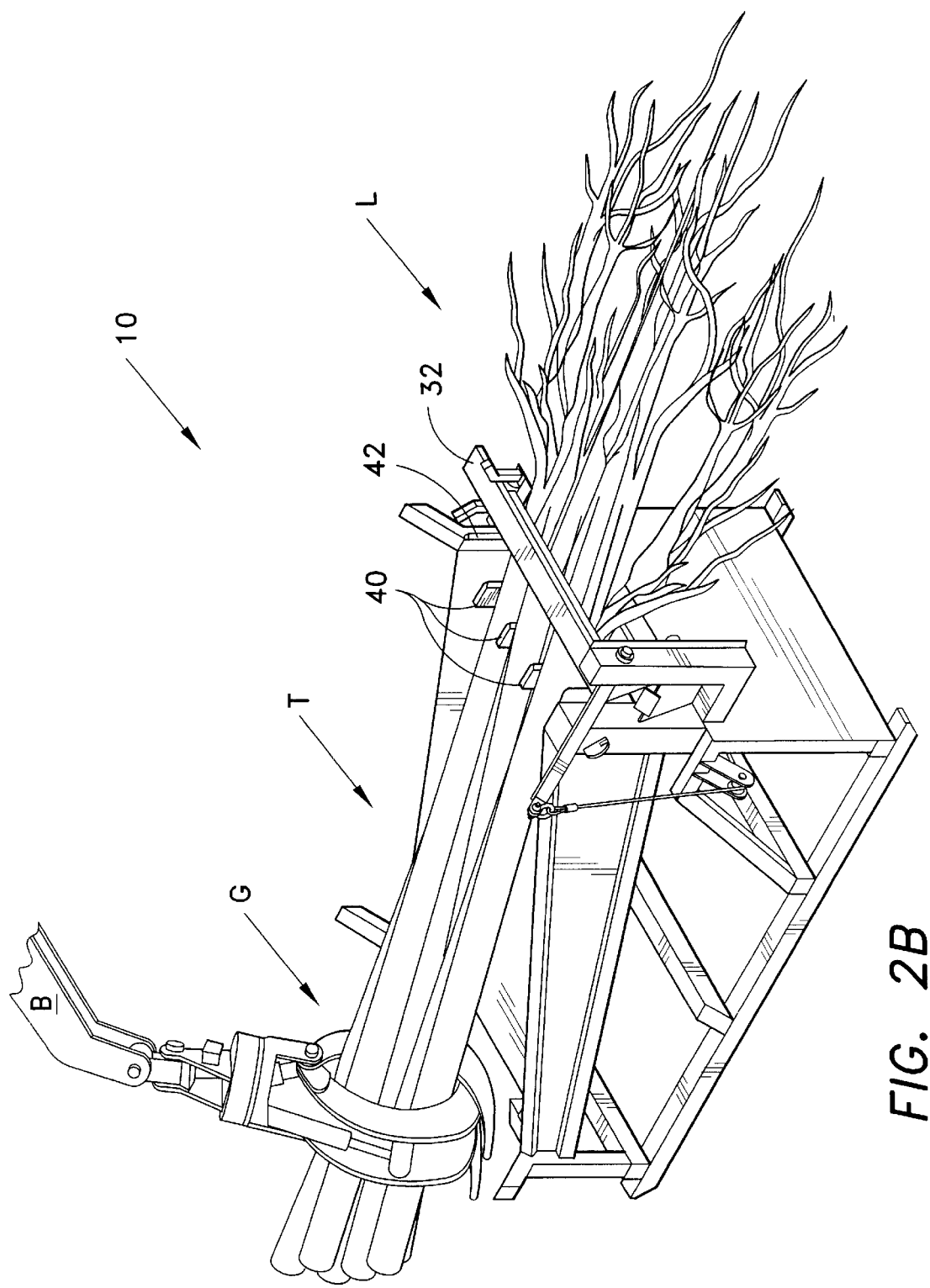
FIG. 2B is an environmental rear perspective view of the tree delimber according to FIG. 1B.
Figure 2C:
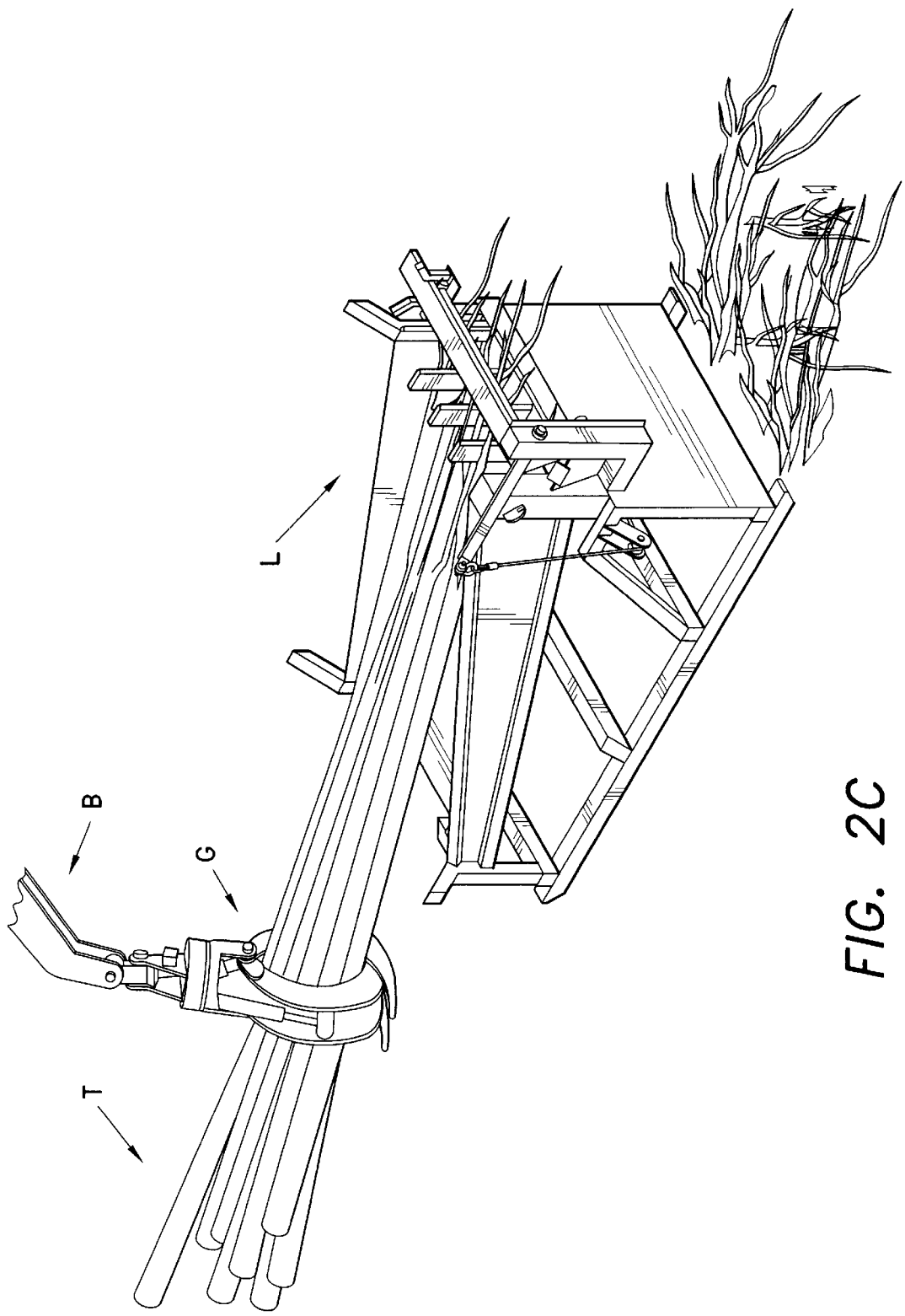
FIG. 2C is an environmental rear perspective view of the tree delimber according to FIG. 1B with the trees delimbed.
Figure 3:
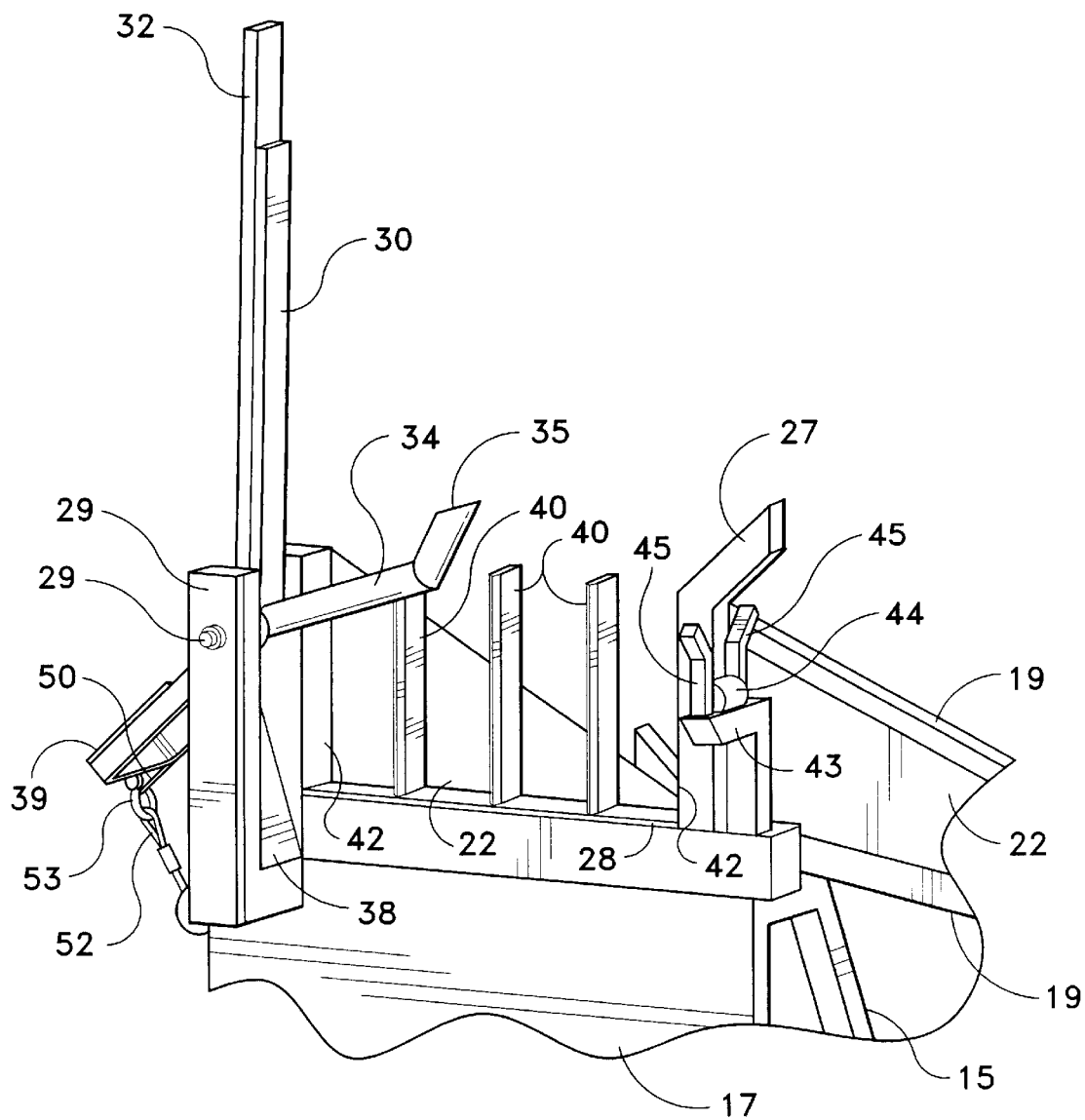
FIG. 3 is a detail right rear perspective of the tree delimber of FIG. 1 with the blade in the up position.
Figure 4:
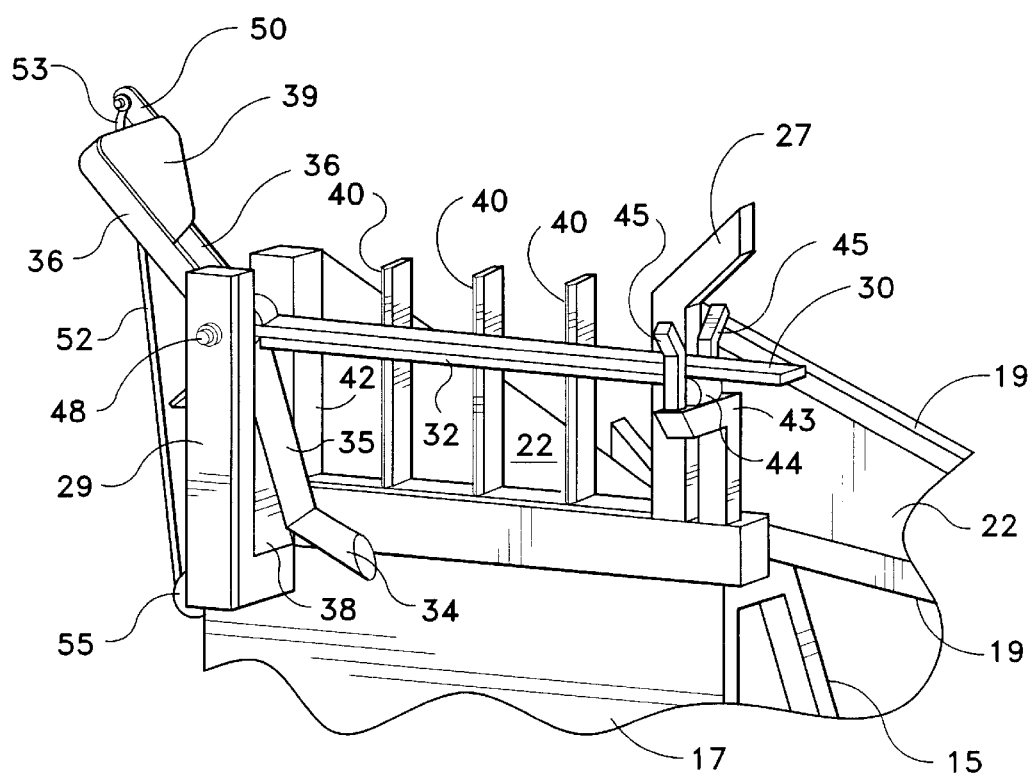
FIG. 4 is a detail right rear perspective view of FIG. 1 with the blade in the down position.
Figure 5:
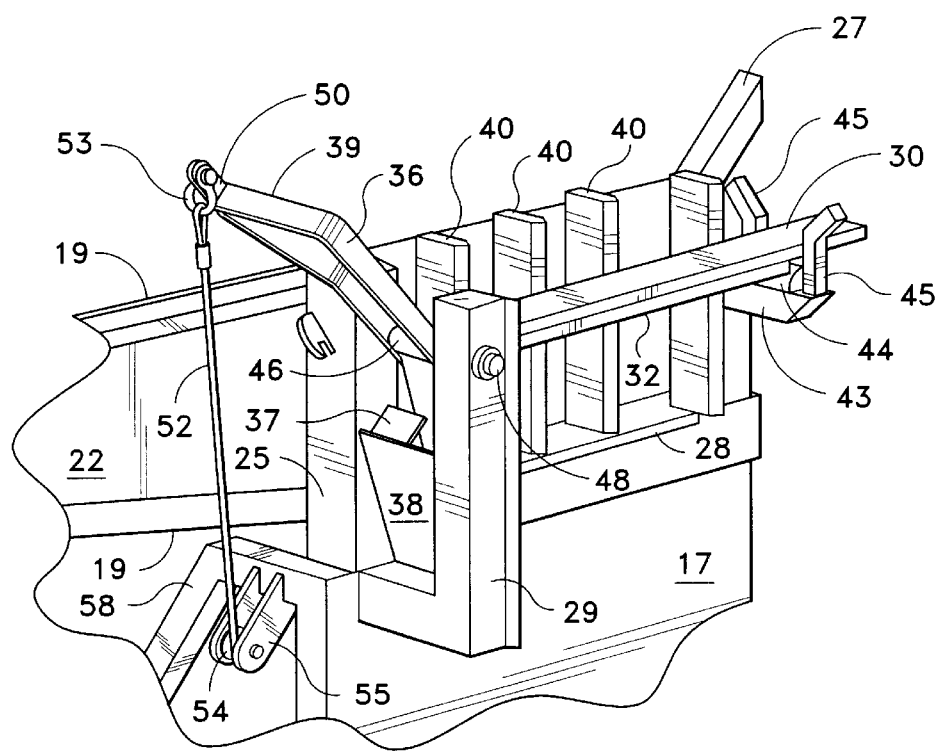
FIG. 5 is a detail left rear perspective view of the tree delimber of FIG. 1 with the blade in the down position.
Figure 6:
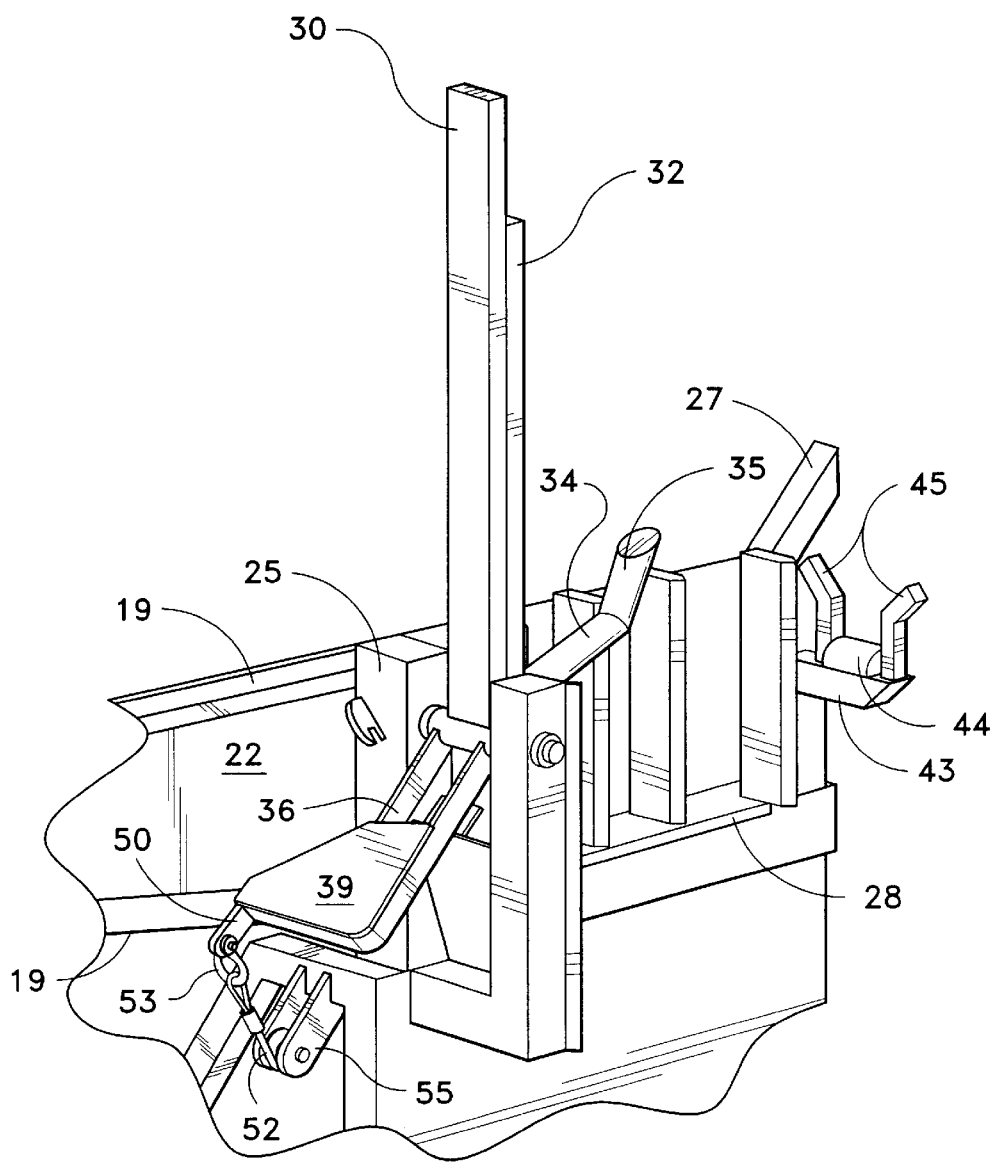
FIG. 6 is a detail left rear perspective view of FIG. 1 with the blade in the up position.
Figure 7:
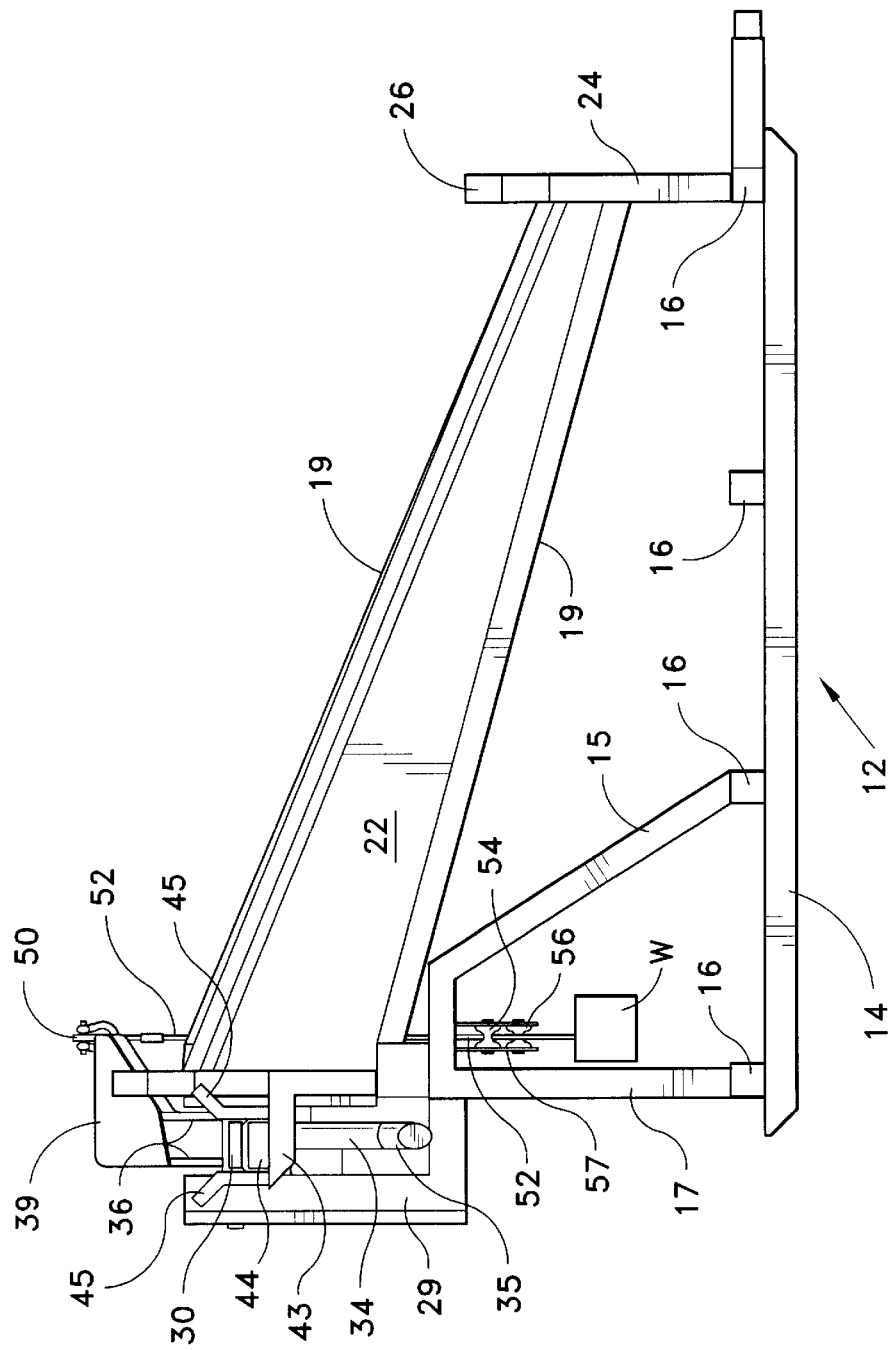
FIG. 7 is a side elevation view of the tree delimber of FIG. 1.
Figure 8:
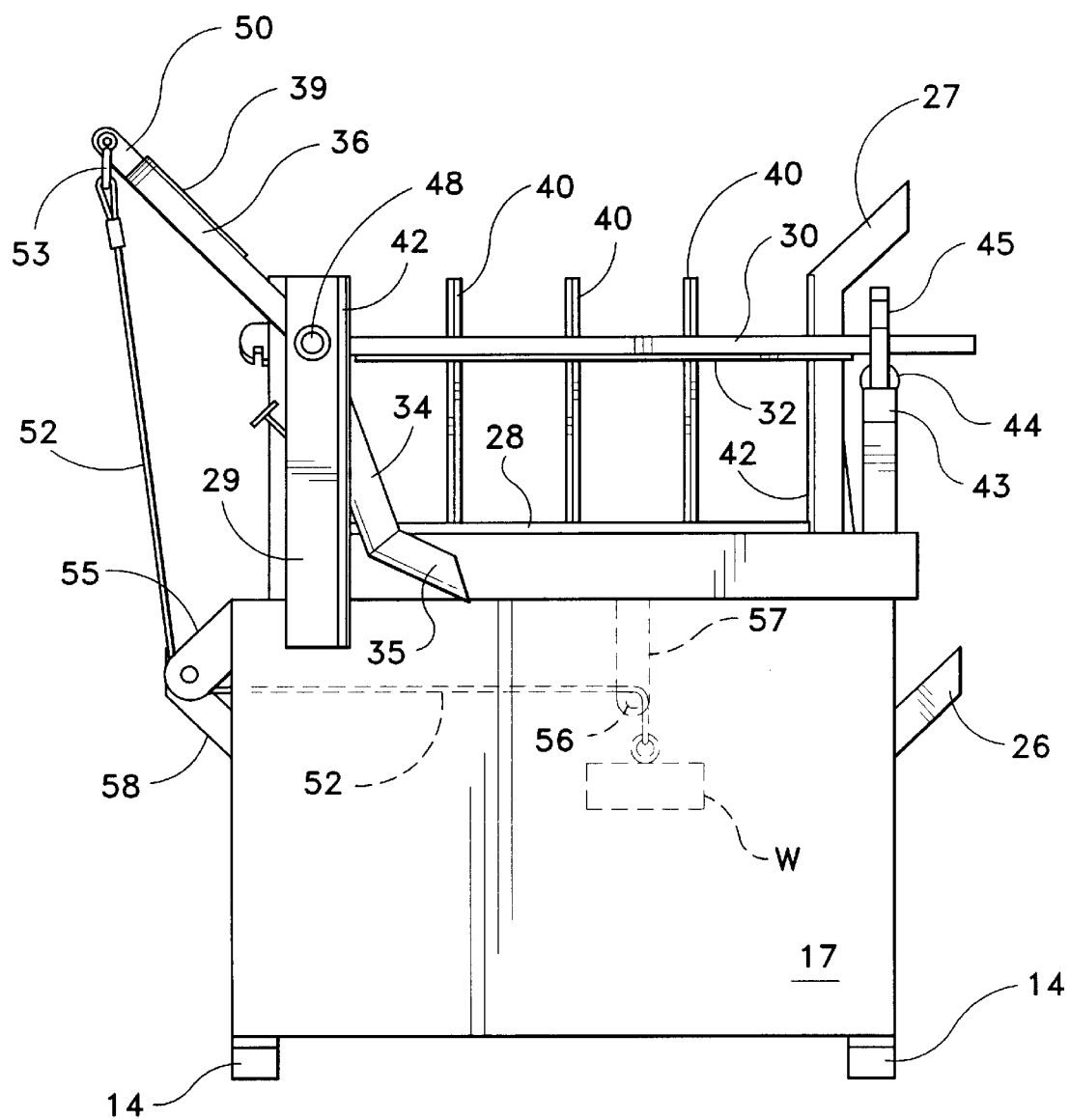
FIG. 8 is a rear elevation view of the tree delimber of FIG. 1.

In operation, as best seen in FIGS. 1B, 2B, and 2C, cut tree trunks T having limbs L are held by boom B in grapple G. The boom is lowered, lowering the cut trees to descend onto the open tree delimber 10 so to lower trigger arm 34, closing top knife body 32 and knife edge 30 over the trunks at a point below the limbs L, distributing trunks T among the openings formed between vertical knives 40 and 42(see FIG. 2B). Boom B and grapple G are activated by a crane or similar equipment, pulling the trunks T forward along the chute 18, the knife edges removing the limbs L from the trunks T until the trunks are positioned to lift from the delimber 10 and moved to a location for topping by a cutoff saw (not shown).

It is to be understood that the present invention is not limited to the embodiments described above, but encompasses any and all embodiments within the scope of the following claims.

We claim:

1. A tree delimber for delimbing a plurality of trees comprising:

an elongated chute having a front end, a rear end, and first and second opposing sidewalls;

a base for supporting said chute, said base having first and second front supports for supporting said chute front end, and a rear support for supporting said chute rear end;

an elongated top knife member having a mounted end and a free end and mounted for rotation at said chute rear end, between a substantially vertical open position and a substantially horizontal closed position extending across said chute rear end;

said top knife member having an upper body and a knife edge extending therealong beneath the upper body when in the closed position;

a top knife support for rotatably supporting said top knife member at said mounted end and extending upward from said chute rear end at said first chute sidewalls;

a top knife horizontal stop located at said chute rear end at said opposing chute sidewall for supporting said top knife free end when in a closed position;

a top knife horizontal stop support extending upward from said rear end at said second chute sidewall;

a chute horizontal frame element supported by said rear chute end support and extending across said chute rear end and having an upper edge;

outside vertical knives extending vertically upward from said chute rear end at said chute first sidewall and second sidewall, the edges of which face rearwardly relative to said delimber; and means for selectively rotating said top knife member from an open vertical position to a horizontal closed position;

whereby said delimber receives a plurality of cut trees having branch and limb-free trunk portions lengthwise along said elongated chute and so placed and oriented the substantial portion of the limbs and branches of the cut trees extend over the rear end of the chute at said horizontal frame upper edge;

whereby said means for rotating said top knife member from the vertical open position to a generally horizontal position resting on said trees and/or said horizontal stop; and whereby a grapple of a boom crane or similar equipment pulls the plurality of trees as a unit along said chute, pulling the branches and limbs of the trees through the opening formed by the horizontal frame edge, the outer vertical knives and the upper knife edge such that limbs and branches are separated from the trunks and fall to the ground behind said tree delimber.

2. The delimber of claim 1, further comprising a plurality of vertical knives spaced along and extending upward from said chute at the rear end thereof, said knives having respective edges facing rearwardly such as to define a plurality of horizontally disposed openings between said horizontal frame edge and said upper edge, and said outer vertical knives when said top knife member is in the closed position, each opening receiving one or more tree trunks.

3. The delimber of claim 2, wherein said top knife member is so arranged on said top knife support such that said knife body travels in an arc immediately to the rear of said vertical knife edges and said rear horizontal frame.

4. The delimber of claim 3, wherein said rear support comprises a vertically oriented rear plate supporting said horizontal rear frame member and said chute rear end and said to knife member support.

5. The delimber of claim 4, further comprising a first rear support frame member extending vertically from said rear plate and forming a rear frame member for said first sidewall, and a second rear support frame member extending vertically from said rear plate and forming a rear frame member for said second sidewall.

6. The delimber of claim 5, further comprising a top knife pivot sleeve rotatably supported on a pivot bar horizontally supported between said top knife support and said first rear support frame member at a point such that said top knife member is spaced a desired distance above said rear horizontal frame member when in a closed position, said top knife body being attached at its supported end to said top knife pivot sleeve and its free end supported by said horizontal stop.

7. The delimber of claim 6, wherein said means for selectively rotating said top knife member comprises:

a trigger arm mounted to and extending from said pivot sleeves to a free end;

a counterweight arm mounted to and extending from said pivot sleeve to a free end; and a counterweight suspended from said free end of said counter weight arm; said trigger arm being mounted such that when said top knife member is in an open position, said trigger arm extends horizontally inwardly toward said horizontal stop;

said counter weight arm being mounted such that when said top knife member is in an open position, said counterweight arm extends outwardly and downwardly against a stop, said counterweight arm is mounted generally opposed to said trigger arm;

whereby, upon cut trees being lowered on said trigger arm, said trigger arm rotates said pivot sleeve which moves said top knife member to a closed position over the trees and raises said counter weight arm upward against the gravitational pull of the counterweight.

8. The delimber of claim 7, wherein said means for rotating said top knife member further comprises a first pulley mounted on an outward reaching first pulley bracket and located below said free end of said counter weight arm free end, a second pulley mounted on a downward reaching second pulley bracket located forward of said back plate and attached to said horizontal rear frame member at a point about the lateral midpoint thereof, and a counterweight line extending downward from said counterweight arm free end, around said first pulley, generally horizontally and around said second pulley, and downward supporting said counterweight, whereby, upon downward movement of said trigger member, said free end of said counterweight arm is raised, pulling said counterweight and line upward over said second pulley, and under said first pulley.

9. The delimber of claim 8, wherein said base further comprises parallel skids extending from front to rear of said chute spaced below respective said first and second sidewalls and supporting said chute front supports and said rear support plate.

10. The delimber of claim 9, wherein said base further comprises at least three cross members spaced along and extending between said parallel skids.

11. The delimber of claim 10, wherein said chute is slanted upward from its front end to its rear end.

12. The delimber of claim 11, wherein said at least three cross members include a front cross member respectively bearing said chute front supports, and a rear cross member, said rear cross member supporting a pulley bracket support extending at a rearward upward angle therefrom and having a horizontal portion extending rearwardly to abut said back panel support, said horizontal portion supporting said first pulley bracket.

13. The delimber of claim 12, further comprising upper and lower frame members supporting said first sidewall and extending between a first chute front support and said first rear support frame member, and upper and lower frame members supporting said second sidewall and extending between a second chute front support and said second rear support frame member.

14. The delimber of claim 13, wherein each said outer vertical knife is supported along its outer vertical length by said first rear support frame member and said second rear support frame member respectively.

15. The delimber of claim 14, wherein said top knife support has a lower portion extending horizontally rearwardly from said back support plate and a vertical portion extending vertically upward and spaced from said first rear support frame member.

16. The delimber of claim 15, further comprising a top knife horizontal stop support having a lower vertical portion extending upward from said rear chute wall and an upper horizontal portion extending rearwardly for supporting the free end of said top knife body when in the closed position.

17. The delimber of claim 16, further comprising top knife guides extending vertically from said horizontal portion of said top knife horizontal stop support at each side thereof and having angled upper angled portions mutually extending outward from said top knife support so as to guide said free end of said top knife body over said top knife horizontal stop.

18. The delimber of claim 17, further comprising outwardly extending inclined wing bars connected at the respective tops of said first and second chute front supports for receiving said cut tree trunks within said chute.

19. The delimber of claim 18, further comprising an outwardly extending inclined wing bar connected at the top of said second vertical rear support.

20. The delimber of claim 19, further comprising a butt plate located on the free end of said counterweight arm, said butt plate being generally triangular shaped and having a forward corner, said butt plate having a counterweight line bracket extending outward from said forward corner for attachment of said counterweight line by means of an attachment ring, whereby said counterweight line extends downwardly to said first pulley and bracket forward of said back support plate.

\* \* \* \* \*